Sept. 10, 1940.  W. P. STEVENS  2,214,311
TRUCK
Original Filed Sept. 23, 1938
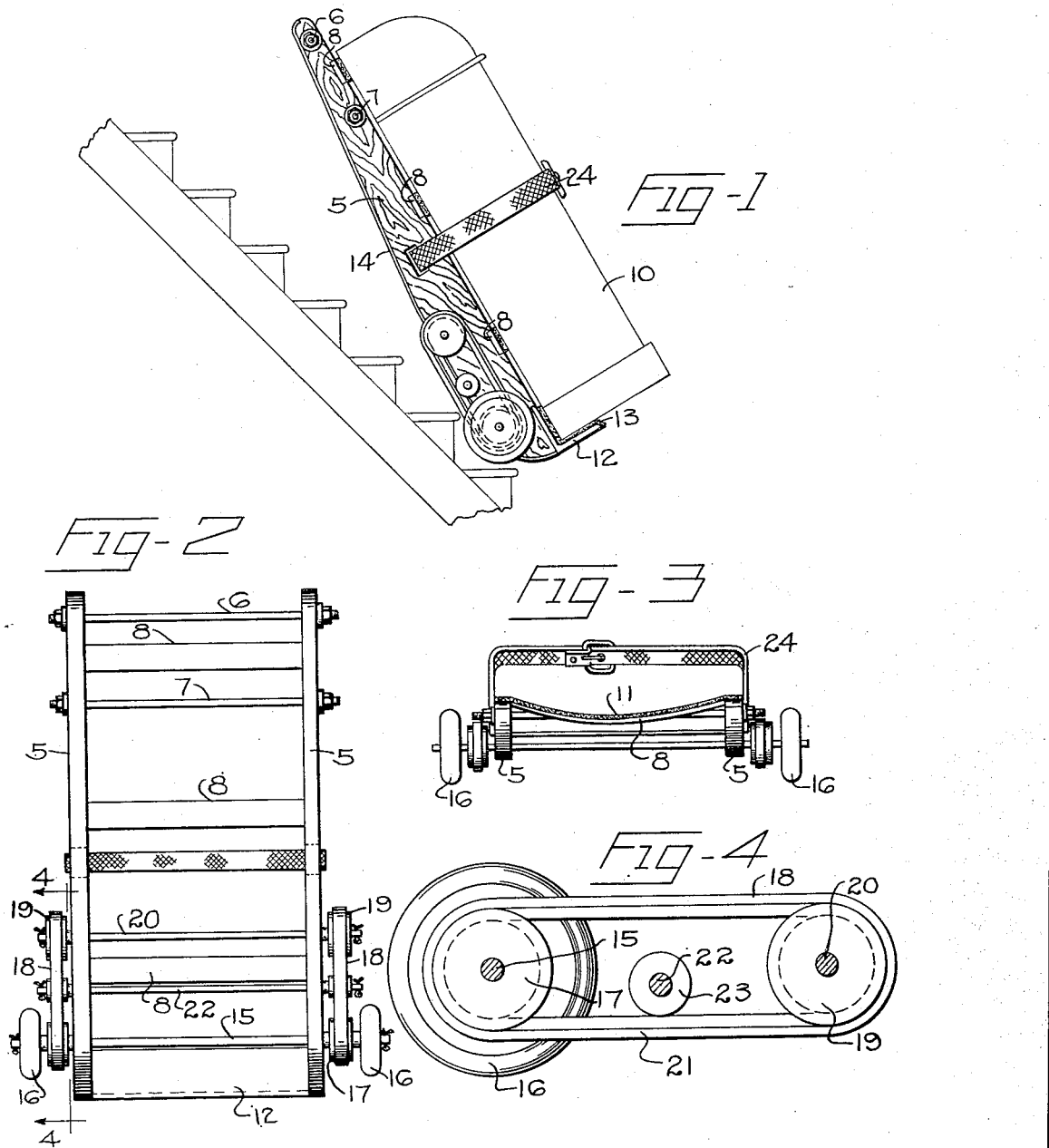
William P. Stevens
INVENTOR Patented Sept. 10, 1940

2,214,311

UNITED STATES PATENT OFFICE 2,214,311

TRUCK

William P. Stevens, Augusta, Ga., assignor to W. P. Stevens and W. H. White, a partnership Application September 23, 1938, Serial No. 231,435
Renewed February 9, 1940

2 Claims. (Cl. 280—54)

My invention relates to hand trucks of the type designed for carrying objects up and down stairways and has as one of the principal objects thereof the provision of a hand truck equipped with auxiliary means coacting with the wheels of said truck in a manner to engage the treads of a stairway whereby the operation of the truck thereover is made easier.

Another object of my invention is to provide a truck of the character described wherein the auxiliary means serves to effect engagement with the treads of a stairway to preclude engagement of the latter with the truck body.

A further object of my invention is to provide a device of the character described which is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is a side elevation of my invention illustrating the latter associated with a stairway.

Figure 2 is a bottom plan view of my novel form of truck.

Figure 3 is an end elevation thereof.

Figure 4 is a sectional view on an enlarged scale taken on the line 4—4 of Figure 2.

In practicing my invention I provide a hand truck which comprises a frame including a pair of side members 5 which may be made of wood and slightly tapered in width from their lower ends upward so that their upper ends may be gripped by the hands of the operator in the manipulation of the truck. The members 5 are secured in spaced parallelism by upper and lower spaced tie rods 6 and 7 respectively, either of which is adapted to be gripped by the operator in the manipulation of the truck.

Connecting the side members 5 below the tie rods 6 and 7 are spaced braces 8 which may be made of wood and nailed or otherwise secured at their ends to the confronting sides of the members 5. Each of the members 8 are provided on the outer faces thereof with strips of felt 11 or the like for supporting an object, for instance a water heater 10, loaded on said truck and to preclude marring or damage to said object. The outer faces of the side members 5 at the lower ends thereof are recessed and accommodate therein sections of angle irons 12, the latter being also provided with strips of felt 13 or the like for engagement with the object 10 to preclude damage thereto and maintaining the object in supported condition on said truck.

The lower and front faces of the members 5 are provided with wear strips 14 for protecting said members. The front ends of the members 5 have extending therethrough a transverse shaft 15, the outer ends of which have mounted thereon a pair of truck wheels 16. Also mounted on the ends of said shaft 15 between the members 5 and said wheels are pairs of grooved pulleys 17 over which are trained endless belts 18, the latter being also trained over grooved pulleys 19 rotatably mounted on a shaft 20, the ends of which extend laterally of the side members 5 and are spaced an appreciable distance upwardly relative to the shaft 15.

The pulleys 17 and 19 are of a lesser diameter than the wheels 16 but extend an appreciable distance below the lower faces of the members 5 whereby to dispose the lower runs 21 of the belts below the bottom of the truck. A cross shaft 22 is interposed between the shaft 15 and shaft 20 and has mounted on the ends thereof rollers 23 for engagement with the inner faces of the lower runs 21 of the belts. A strap 24 extends transversely through the members 5 and is adapted to be secured over and about the object carried by the truck whereby to secure the latter in adjusted position thereon.

In use, when the truck is being operated up or down a flight of stairs, the lower runs 21 of the belts will engage the outer edges of the treads of the steps to effect a relatively smooth passage of the truck and absorb the bumps and shock imparted thereto by the edges of the treads.

From the foregoing it will be apparent that I have provided a simple and efficient device whereby trucks may be readily operated up and down flights of stairs in a manner to minimize the labor incident thereto and also to effect a relatively smooth passage of the truck without resultant injury to the object carried thereon or to the treads of the stairs.

What I claim is:

1. A truck of the class described, comprising, a truck frame equipped with a transversely extending shaft at one end thereof, wheels mounted on the ends of said shaft, pulleys mounted on said shaft adjacent said wheels, pulleys rotatably mounted on said frame in proximity to said first mentioned pulleys, endless belts trained over said first and second mentioned pulleys and having runs extending beyond said frame and coacting with said wheels in engaging the treads of a stairway to effect easy operation of said truck over said treads, and rollers rotatably mounted on said frame and engaging said runs for maintaining the length of the latter disposed beyond said frame to preclude engagement of said treads with said frame.

2. A truck of the class described, comprising, a truck frame equipped with a transversely extending shaft at one end thereof, wheels mounted on the ends of said shaft, pulleys mounted on said shaft adjacent said wheels, pulleys rotatably mounted on said frame in proximity to said first mentioned pulleys, endless belts trained over said first and second mentioned pulleys and having runs extending beyond said frame between the latter and said wheels and coacting with said wheels in engaging the treads of a stairway to effect easy operation of said truck over said treads, and rollers rotatably mounted on said frame and engaging said runs for maintaining the length of the latter disposed beyond said frame to preclude engagement of said treads with said frame.

WILLIAM P. STEVENS.